June 23, 1953 W. R. KING 2,643,006
AUTOMATIC PIPE HANDLER
Filed Sept. 28, 1949 12 Sheets-Sheet 3

WILLIAM R. KING
INVENTOR:

BY Lester B. Clark
 + Ray L. Smith

ATTORNEYS

June 23, 1953  W. R. KING  2,643,006
AUTOMATIC PIPE HANDLER
Filed Sept. 28, 1949  12 Sheets-Sheet 5

WILLIAM R. KING
INVENTOR.

BY Lester B Clark
 + Ray L. Smith

ATTORNEYS.

June 23, 1953 W. R. KING 2,643,006
AUTOMATIC PIPE HANDLER
Filed Sept. 28, 1949 12 Sheets-Sheet 8

WILLIAM R. KING
INVENTOR.

BY Lester B. Clark
+ Ray L. Smith
ATTORNEYS.

June 23, 1953  W. R. KING  2,643,006
AUTOMATIC PIPE HANDLER
Filed Sept. 28, 1949  12 Sheets-Sheet 10

WILLIAM R. KING
INVENTOR

BY Lester B. Clark
Ray L. Smith
ATTORNEYS.

June 23, 1953 W. R. KING 2,643,006
AUTOMATIC PIPE HANDLER
Filed Sept. 28, 1949 12 Sheets-Sheet 11

WILLIAM R. KING
INVENTOR.
BY Lester B. Clark
Ray L. Smith
ATTORNEYS

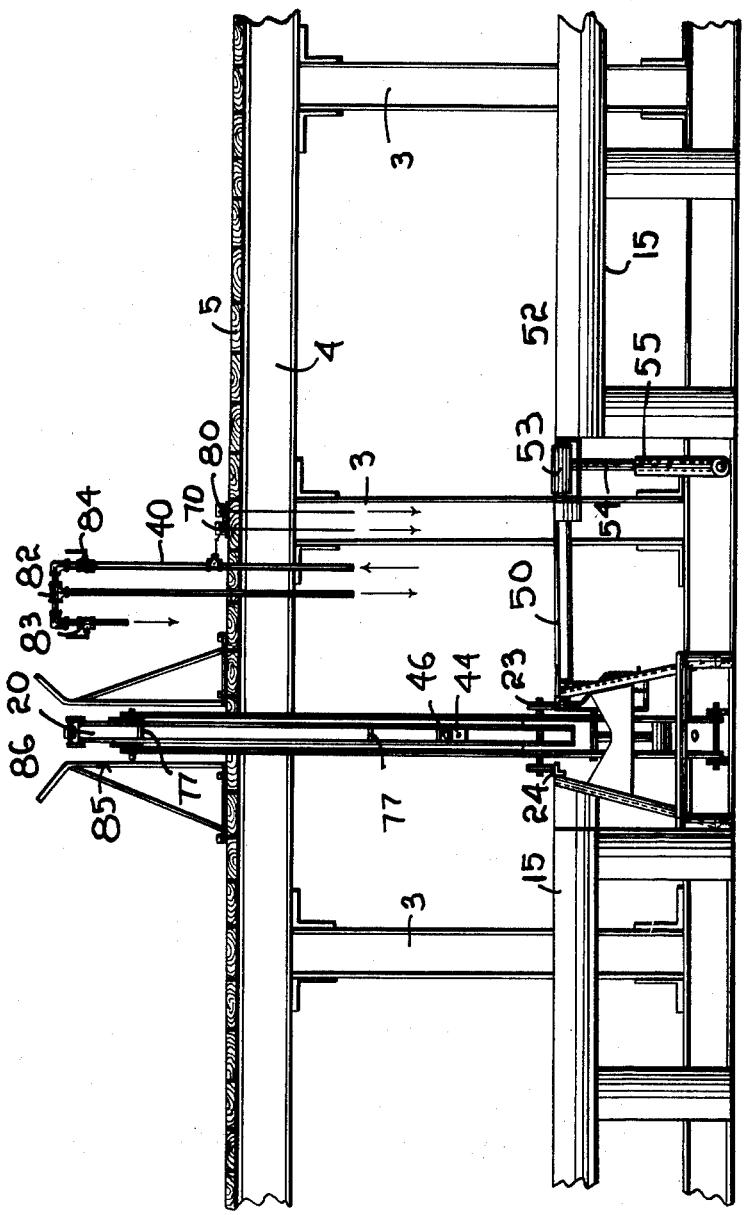

Patented June 23, 1953

2,643,006

UNITED STATES PATENT OFFICE 2,643,006

AUTOMATIC PIPE HANDLER

William R. King, Longview, Tex.

Application September 28, 1949, Serial No. 118,351

5 Claims. (Cl. 214—2.5)

The invention relates to a means and method of handling pipe at the rig in the rotary method of drilling wells.

As a well is drilled by the rotary method, the bit penetrates the earth and additional lengths of drill pipe are added at the surface. When, however, the bit is to be changed all of the pipe must be withdrawn from the well, the bit renewed, and the pipe again lowered into the well.

When, however, it is necessary to change the size of the drill pipe for various reasons or when the well is completed and it is desired that the drill pipe be removed from the derrick, the sections must be taken apart and removed from the derrick floor.

The pipe rack on which the pipe is stored is usually close to ground elevation, whereas the drilling rig derrick floor may be as high as twenty feet from the ground. Thus it has always been quite a problem to elevate the lengths of drill pipe one by one to the derrick floor as they are needed for addition to the drill string during the drilling operation, as well as to remove the sections singly from the floor to the pipe rack when breaking down.

The practice in the past has been to have an inclined sort of runway or platform, and it required the use of a cat line to tie onto the pipe, pull the pipe section up onto the derrick floor, and when the pipe section was to be removed it had to be skidded down the inclined platform and pulled out onto the pipe rack.

The present invention contemplates an automatic handler for the lengths of drill pipe. These sections of pipe usually approximate thirty feet in length, and some of the larger diameter pipe is very heavy and cumbersome to handle.

It is contemplated that the pipe may be elevated and translated directly from the pipe rack to the derrick floor by the pipe handler therein, and that the pipe may be again translated and lowered to the pipe rack with a minimum of effort when the automatic pipe handler is once installed on the drilling rig because it is in the form of an attachment which may be disposed adjacent the pipe rack for ready use.

It is one of the objects of the invention to provide a pipe handler upon which a drill pipe section may be rolled from the pipe rack and then a dolly portion of the handler elevated at one end and translated to position the inner end of the pipe section in overhanging position relative to the derrick floor. In this manner the pipe may then be readily removed from the dolly to a suspended position for connection to the drill string in the well bore. When the drill string is being broken down the pipe sections may be unscrewed and swung over to a position to be deposited upon the elevated dolly and then the dolly lowered and translated back to its inoperative position at the pipe rack so that the pipe will be rolled from the dolly onto the pipe rack to complete the operation.

It is one of the objects of the invention to provide a means and mechanism for elevating and lowering pipe sections from the pipe rack to the derrick floor and from the derrick floor back down to the pipe rack in the making of and breaking down of a string of drill pipe in the rotary method of drilling wells.

Another object of the invention is to provide a power operated dolly which may be controlled from the derrick floor by the driller on the drilling rig so that pipe may be elevated without the necessity of one of the roughnecks climbing down from the derrick floor to the pipe rack each time a section of pipe is desired.

A still further object of the invention is to provide the combination of an automatic pipe handler with controls whereby a section of pipe may be released to roll upon the dolly and thus be elevated to the derrick floor for incorporation in the drill pipe and whereby a section of pipe removed from the drill pipe and lowered to the pipe rack by the handler may be automatically ejected from the dolly so as to roll to a storage position on the pipe rack.

Another object of the invention is to provide a pipe handler wherein a pipe carrying dolly is elevated and lowered and translated relative to the derrick floor by a power operated linkage mechanism.

A still further object of the invention is to provide a set of rollers for translating a section of pipe longitudinally to position it upon an inclined slide for admittance to the pipe handling dolly in an automatic pipe handler for rotary drilling rigs.

Still another object of the invention is to provide a control device whereby one section of pipe may be admitted to the pipe handling dolly while the remaining sections are retained in a ready position.

While the foregoing explanation has been particularly applied to the handling of drill pipe or drill stem sections, it seems obvious that any desired type of pipe which is to be positioned in the well bore or removed therefrom may be handled by this mechanism; for instance, other types of pipe, such as the casing, tubing, and any other pipe which may be used during the operation of the rotary drilling rig.

Other and further objects of the invention will be readily apparent when the following description is considered in connection with the accompanying drawings, wherein:

Fig. 12 is a view similar to Fig. 11 but illustrating the pipe dolly in elevated position.

Figure 1:
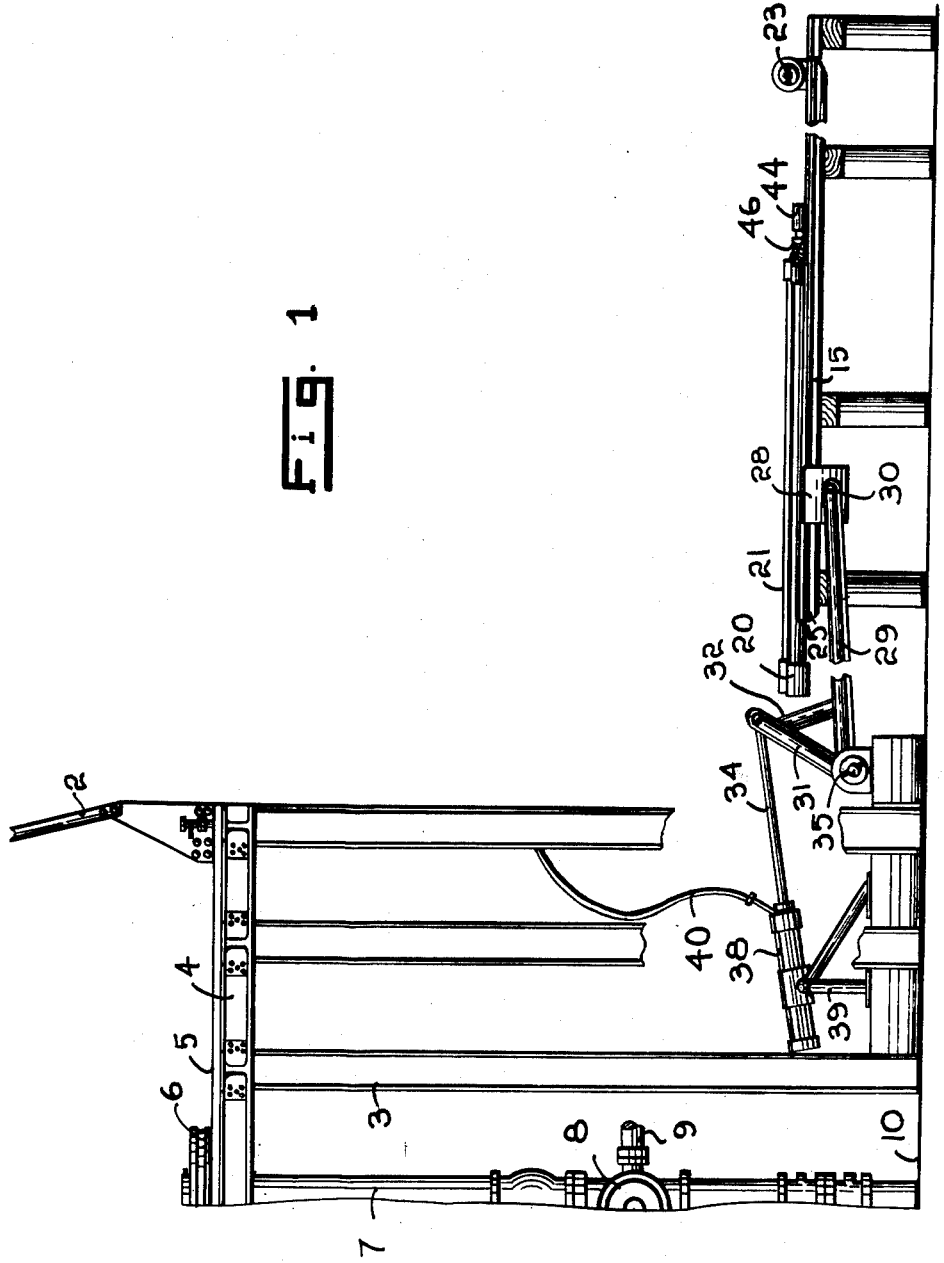
Figure 1 is a side elevation of the automatic pipe handling device disposed at the pipe rack and adjacent the derrick floor of the drilling rig in position to translate the pipe either up to or down from the derrick floor and illustrating a pipe section loaded on the dolly ready to be elevated.

In Fig. 1 the derrick which is used in the rotary method of drilling wells is illustrated generally at 2 and includes a considerable number of foundation or support members 3. These support members carry the framework 4 for the derrick floor 5, which floor in turn supports the rotary table 6, which is disposed above the upper end of the casing 7, which extends down into the well. Suitable drilling and control valves 8 are arranged on the casing, as well as the flow lines 9 to take care of the circulation of drilling fluid during the drilling operation and the production of fluid from the well after the well is completed.

The derrick floor 5 is usually 10 or more feet from the ground level 10 so as to permit room for the valves 8 and the other mechanisms which are usually disposed in the cellar underneath the derrick floor.

As the drilling operation is commenced, a drill bit is connected to the lower end of a section of relatively heavy pipe known as "drill collar," and a number of such sections are added as the bit is rotated and the drilling proceeds. After a suitable number of sections of drill collar have been connected so as to afford stiffening directly above the bit, then the usual sections of drill pipe are next added. This drill pipe is of different size depending upon the depth of the well and other conditions which are to be encountered. Usually such drill pipe runs from three to six inches in diameter.

Each section of drill pipe is about thirty feet in length, and as the well is drilled thirty feet another section of pipe must be added.

Each time a section of pipe is added, the section must be elevated from the pipe rack 15, which is shown in the right-hand side of Fig. 1. This pipe is in the form of a platform several feet above the earth surface 10, upon which a number of sections of pipe are stored until it is necessary to add them to the drill string.

This pipe rack is in the form of a flat flooring from which the pipe will be rolled toward the center so that it can be moved up into the derrick on the derrick floor.

With the usual construction there is an inclined flooring from the elevation of the derrick floor 5 down to the elevation of the pipe rack 15. Every time a section of pipe is to be added, one of the crew must climb down to the derrick floor, pull a cat line down with him, and connect it onto a length of drill pipe, whereupon the cat line is operated to pull the drill pipe up onto the derrick floor. The crewman then must come back up to the derrick floor to assist in his usual duties while the thirty feet of formation is being drilled. This operation must be repeated many times; and when it is considered that wells are now being drilled from ten to fifteen, sixteen, and seventeen thousand feet, it will be readily apparent that such trips every thirty feet constitute a substantial waste of time.

When the drilling operation is completed or when the size of the drill pipe being used is to be changed, it is then necessary to uncouple each one of these sections of pipe which have been added to the drill string and lower them down the inclined flooring onto the pipe rack, thereby reversing the operation which had to be carried out in raising the pipe sections to the derrick floor.

The present invention contemplates an automatically operable mechanism whereby the pipe may be quickly elevated or lowered with respect to the derrick floor.

In Fig. 1 the mechanism is shown in the form of a pipe dolly 20. The pipe dolly 20 is of considerably greater length than the length of the usual section of drill pipe so that it may accommodate longer sections of pipe, such as casing, tubing, or any other pipe which may be utilized in the drilling of the well or production of fluids therefrom.

Figure 3:
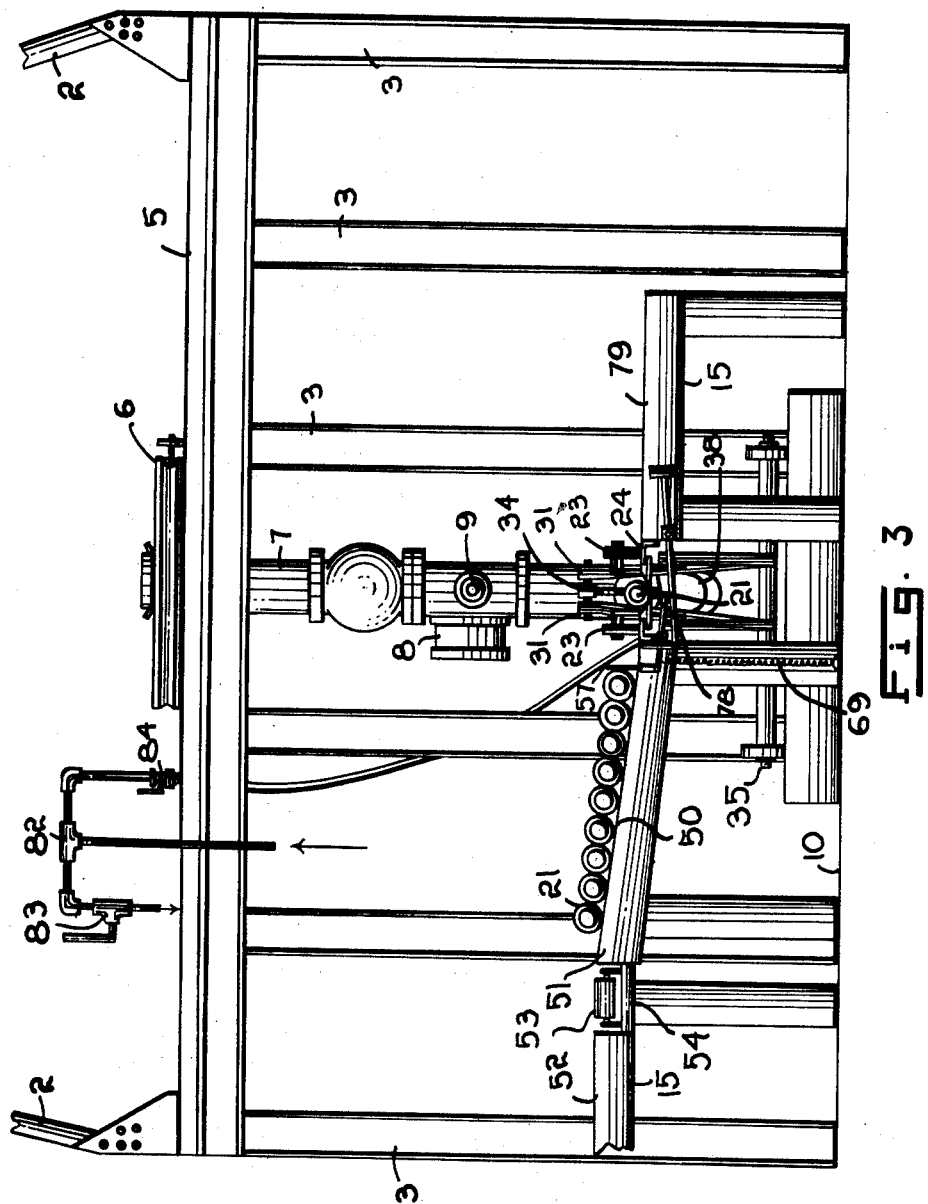
Fig. 3 is an end elevation of the automatic pipe handler illustrating the dolly and a plurality of sections of pipe on the slide ready to be admitted to the dolly for elevation to the derrick floor.
Figure 4:
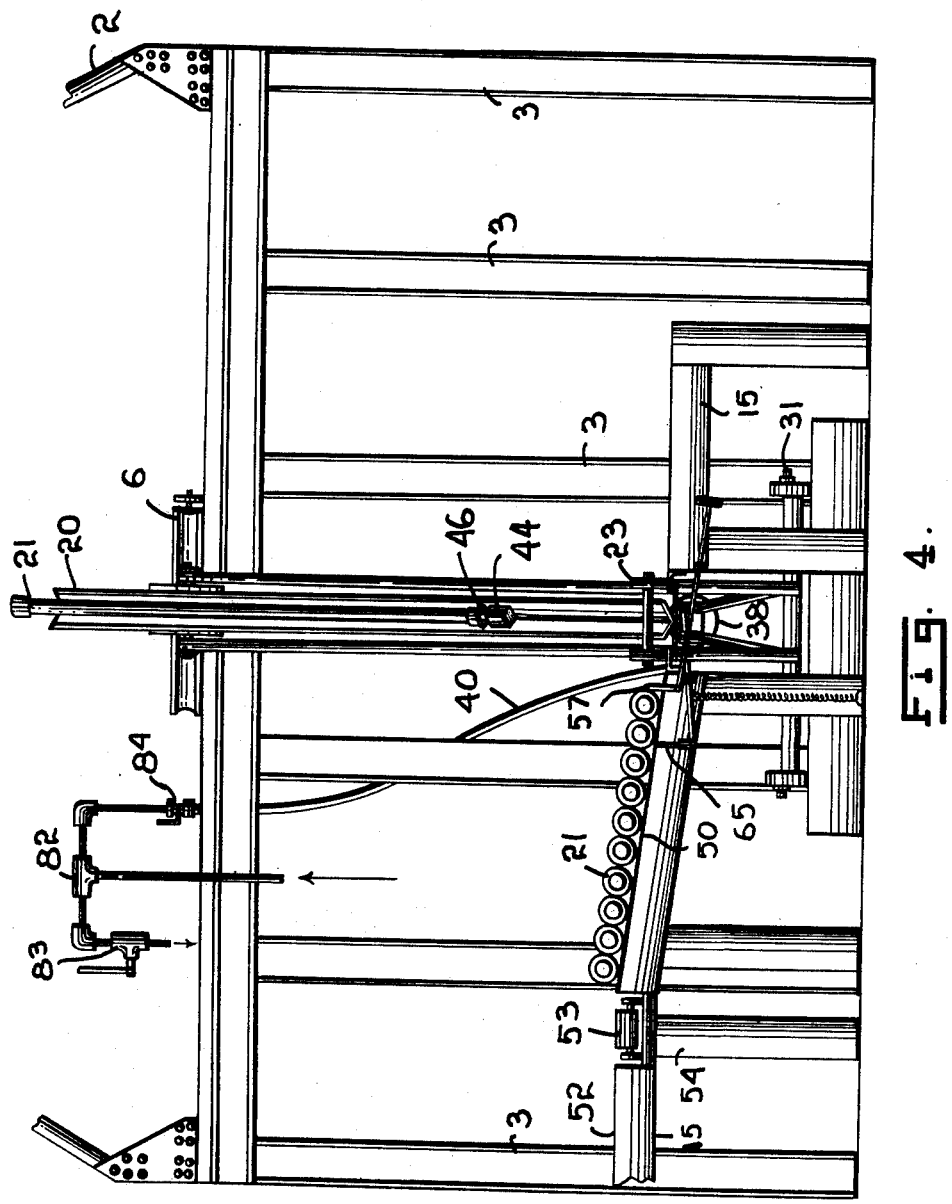
Fig. 4 is a view similar to Fig. 3 but illustrating the dolly as having elevated one of the pipe sections to the derrick floor.

This dolly 20 is shown as having a set of rollers 23 on the outer end thereof, and these rollers are arranged, as best seen in Fig. 3, to roll upon a dolly trackway 24 so as to support the outer end of the dolly 20.

Intermediate the ends and preferably toward the inner end 25, the dolly 20 has a trunnion connection 28 on the under side thereof, and this trunnion connection has a linkage 29 connected thereto by the pivot 30. This linkage 29 includes a short lever 31, and the brace 32 where the lever 31 is connected to a power operated rod 34.

The links 29 and 31 are rigid relative to each other to form a bell crank lever, which is in turn pivoted at 35.

The power operated rod 34 projects into a cylinder 38, which is supported at 39, and a suitable conduit or connection 40 leads into the cylinder so that pressure fluid may be applied in the cylinder to force a piston on the rod 34 inside of the cylinder to the left, as shown in Fig. 1.

Figure 2:
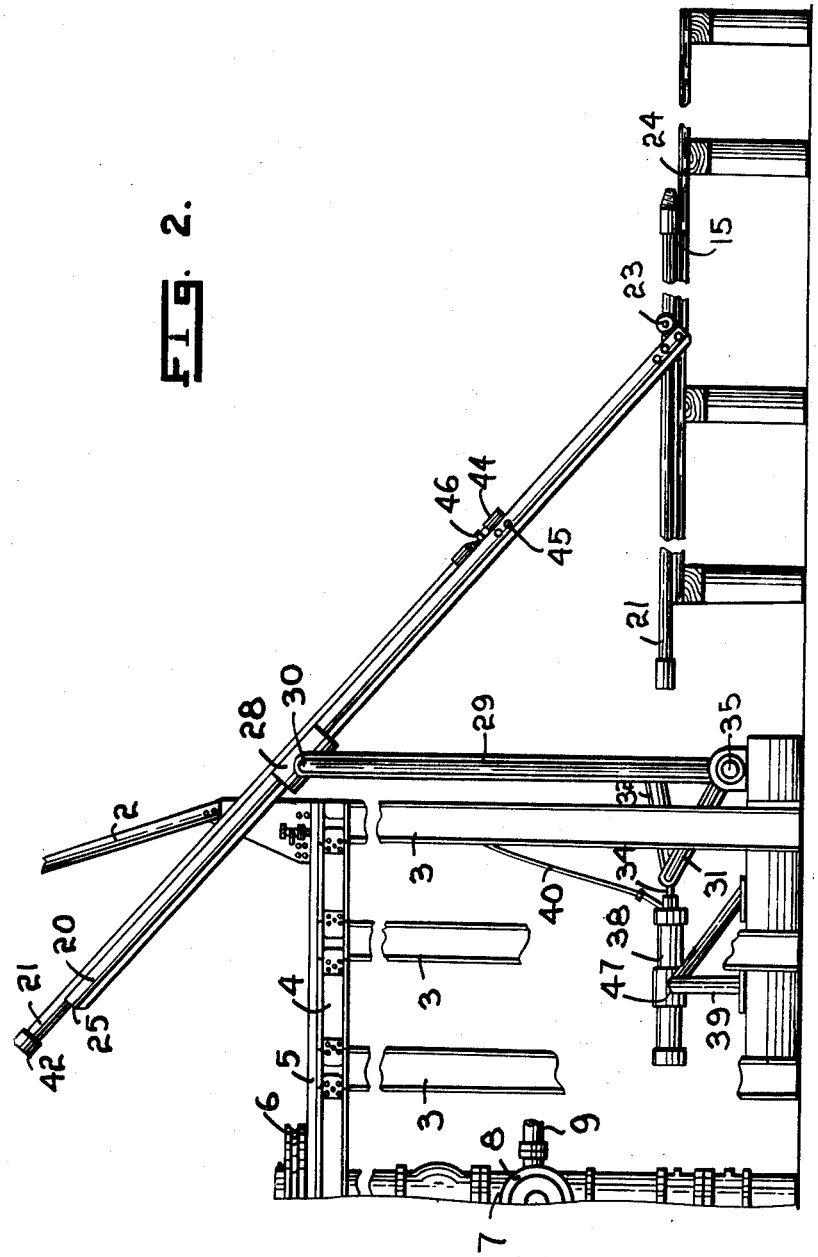
Fig. 2 is a side elevation similar to Fig. 1 but illustrating the pipe after having been elevated and translated to overhang the derrick floor and ready for removal from the dolly.

Any suitable sort of fluid may be used, such as the steam used in powering the drilling rig, the drilling mud which is circulated during the drilling of the well, or pneumatic pressure may be employed, if desired. In either event the driller on the derrick floor operating the control for such fluid admits the fluid into the cylinder, whereupon a thrust to the left is exerted on the rod 34 so as to pivot the linkage 29—31 in a counterclockwise direction so as to elevate the inner end of the dolly. This movement of the elevating mechanism continues until the parts assume the position shown in Fig. 2. In Fig. 2 the trunnion 28 has been elevated to approximately the level of the derrick floor 5, whereas the inner end 25 of the dolly has not only been elevated but has been translated inwardly until it overhangs the edge of the derrick floor, and the pipe section 21 is shown as projecting over the derrick floor where the inner end 42 thereof may be grasped by the elevators by which pipe is handled on the derrick floor.

It will be noted that the rollers 23 have traveled inwardly along the trackway 24 so that the dolly 20 has assumed the inclined position of Fig. 2.

In order to prevent the pipe section 21 from sliding down the dolly, a bumper or stop 44 has been arranged in the dolly and is retained in position by the clamps 45. This bumper may be adjusted as desired to accommodate different lengths of pipe and so as to have the inner end of the pipe project the desired distance beyond the inner end of the dolly. This stop or bumper 44 may have a resilient portion 46 in the form of a rubber or spring against which the drill pipe may abut.

It will be noted that the rod 34 has been retracted into the cylinder 38 and that the cylinder is pivoted at 47 so as to accommodate the tilting movement of the rod as the bell crank lever turns about the pivot 35.

The mechanism for operating the pipe handler is in the nature of controls on the derrick floor.

When a section of pipe is to be lowered to the pipe rack 15 the pipe will be swung into the dolly while it is suspended in the elevators, and can be permitted to slide down the dolly until the outer end of the pipe engages against the bumper 44. The pipe handling dolly can, therefore, be manipulated to return it to the position of Fig. 1, where the pipe is lowered back and downwardly to the elevation of the pipe rack.

While it is intended that this invention may be applied to any type of pipe about the derrick, the description is being particularly given as to drill pipe because of the fact that the drill pipe must be brought into operation and removed from operation during the drilling, and on many occasions the size of the drill pipe is changed. The drill pipe is also very heavy and cumbersome, so that the pipe handler is most convenient in use in handling drill pipe.

As seen in Fig. 3, the pipe rack is made in two sections which are separated by a space of sufficient size to take care of the present attachment, which can be incorporated in the central portion of any pipe rack which is of conventional form.

In order to insert the attachment in the proper position, an inclined platform 50 has been shown as arranged with its upper end 51 at the same elevation as the higher portion 52 of the pipe rack. These two portions, however, are spaced apart by a series of rollers 53. These rollers can thus be seen in enlarged elevation in Fig. 7. They are arranged upon a support 54 which may be suitably adjusted by the pin and socket connections 55, as seen in Fig. 7, so that the rollers will be at the desired elevation.

When a section of pipe 21 is rolled toward the pipe handler from the pipe rack surface 52, it may not be in the proper lengthwise position to be received upon the dolly, and the rollers 53 have been provided so that the pipe may be translated lengthwise to position it to be received in the dolly, as best seen in Fig. 1.

As seen in Fig. 3, a number of the pipe sections 21 will be rolled from the pipe rack across the rollers 53 and onto the slide 50, which is inclined with its lower end adjacent the pipe dolly 20, and in this manner a pipe section may be quickly rolled onto the dolly.

Figure 7:
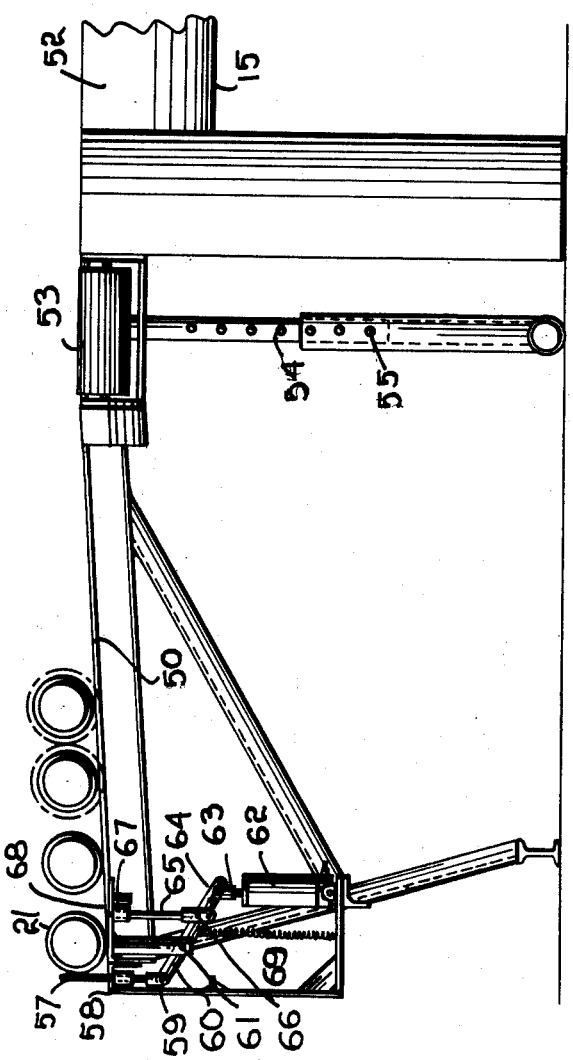
Fig. 7 is an enlarged detailed view of the slide and the control mechanism for admitting the pipe sections to the dolly one at a time.

In order to prevent more than one pipe section rolling onto the dolly and interfering with the pipe section to be elevated, a stop mechanism 57 has been arranged to receive the lowermost pipe section, as best seen in Figs. 3 and 7.

As seen in Fig. 7, the stop mechanism is in the form of a pin or pins which project upwardly through the frame portion 58 so as to receive and hold this lowermost pipe section 21.

The pins 57 are elevated by means of the pivoted connection 59 on a trucking lever 60, which is pivoted at 61 to the framework.

In order to pivot this lever, a power cylinder 62 carries a rod 63 pivoted at 64 on the outer end of the lever 60. A second stop member 65 is pivoted at 66 on the lever and passes through a bearing 67 so as to project upwardly through the surface 68 of the slide and spaced upwardly along the slide 50 a sufficient distance to accommodate the width or diameter of one of the pipe sections 21.

It seems obvious that when the power mechanism 62 is operated, that the lever 60 will be rocked so as to pull the member 57 downwardly and push the member 65 upwardly so that the member 65 catches the second pipe section to prevent it from rolling onto the dolly when the first pipe section is released by the stop 57. So long as the pressure fluid is permitted to remain in the cylinder 62, the stop 65 will project upwardly. When, however, such pressure fluid is shut off, a spring 69 serves to pull the lever 60 downwardly to again depress the member 65 and raise the member 57. The depression of the member 65 releases the second pipe section to roll down into the position to engage the stop 57 so that but one pipe section can be admitted to the dolly at one time.

The lowermost pipe rack portion 15, as seen in Fig. 3, is in position to receive the pipe sections 21 as they are discharged from the pipe dolly so that they may roll onto the pipe rack in a storage position. The mechanism for controlling the admission of the pipe sections to the pipe dolly may be considered as the loader.

Figure 10:
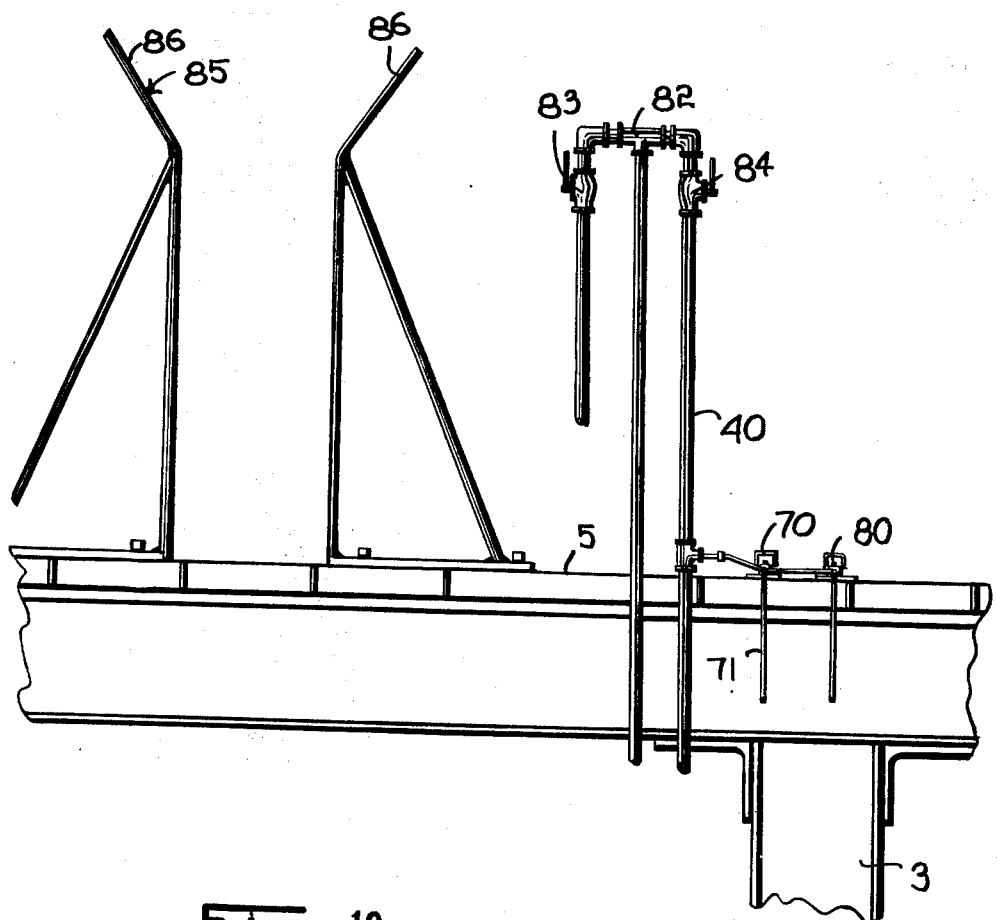
Fig. 10 is an illustration of the control mechanism on the derrick floor showing the valves that regulate the flow of pneumatic or hydraulic fluid actuating the power mechanisms.
Figure 11:
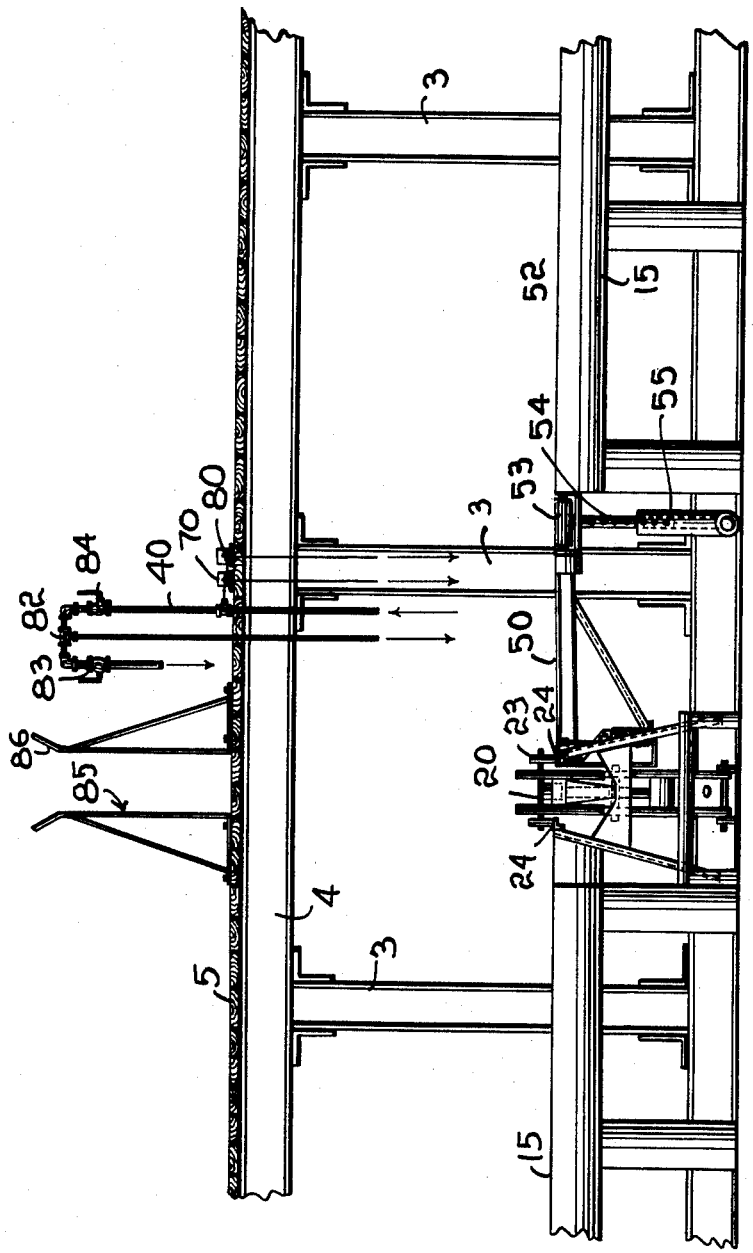
Fig. 11 is an end elevation illustrating the mechanism in detail in combination with the control mechanism on the derrick floor where the pipe dolly is in lowered position.

Figures 10, 11, and 12 each show a control member 70 on the derrick floor which may be in the form of a valve to control pressure fluid, either pneumatic or hydraulic, through the pipe connections 71 which lead to the cylinders for operating the loading mechanism. Thus it is only necessary for the operator on the derrick floor to depress this connection in order to release a section of pipe to be loaded.

Figure 5:
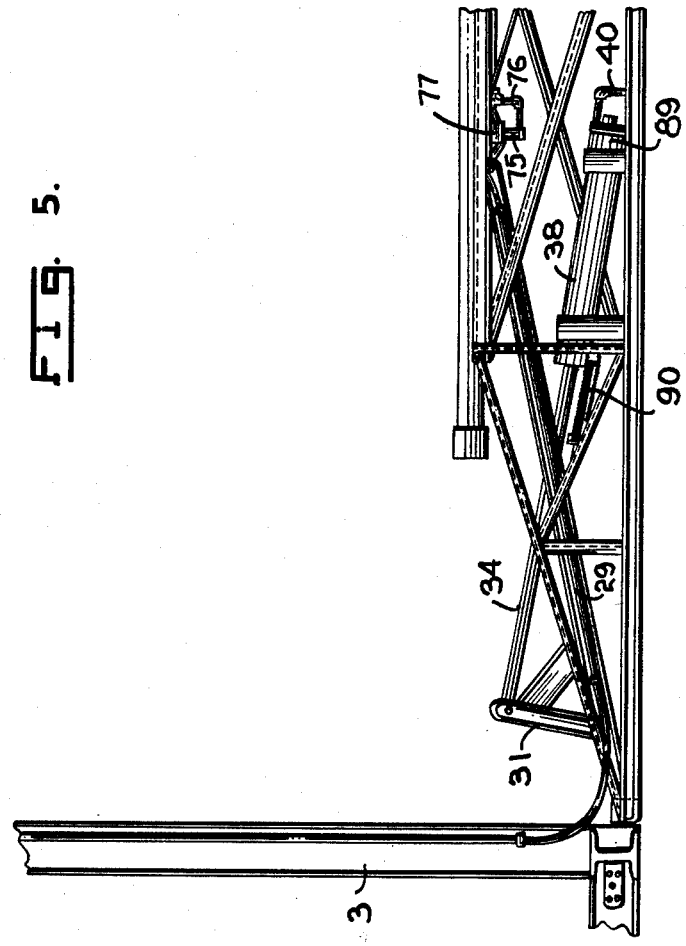
Fig. 5 is a view similar to Fig. 1 but illustrating a modified form of power mechanism which includes a cylinder to receive pneumatic or hydraulic fluid to effect its actuation, and showing the dolly in lowered position.

It will be borne in mind that these sections of pipe weigh many hundreds of pounds and are rather heavy to handle. Therefore, to employ a power mechanism for unloading a pipe section from the dolly, an arrangement has been devised, as seen in Figures 3 and 5, wherein a power cylinder 75 carried by the under side of the dolly may be actuated by the pressure fluid through a connection 76. This cylinder 75 serves to operate a bar or plate 77 which projects upwardly through a slot in the lower portion of the dolly and has an inclined surface 78 which slopes to the right, as seen in Figs. 3, so as to elevate the pipe section 21 and cause it to roll out onto the surface 79 of the pipe rack so as to unload the dolly.

Fig. 12 shows two of these plates 77 disposed intermediate the end of the dolly so that both ends of the pipe will be elevated when it is being unloaded.

Fig. 10 shows a connection 80 by which the unloader may be actuated in a manner similar to the loader 70.

While both the loader and the unloader have been described as pneumatically or hydraulically operated, it seems obvious that they may be either mechanically or electrically operated, as desired. The fluid operation, however, is convenient because of the fact that there is always a source of fluid pressure about the drilling rig, such, for instance, as the water pump, the steam or air pressure, both of which are used about the drilling rig.

Fig. 10 also shows the suitable connections for actuating the dolly and illustrates a pipe manifold 82 which has a two-way plug valve 83 connected to one portion thereof so as to release the pressure in the operating cylinder for the dolly so that the dolly may return to its normal position.

Another two-way plug valve 84 is provided to control the pressure position to the main cylinder in order to operate the mechanism in elevating the section of pipe.

Fig. 10 also shows a guide rack 85 which is in the form of a pair of upright members having the beveled portions 86 thereon so that the pipe being swung about the derrick floor while it is suspended may be directed into this guide mechanism, and in this manner the pipe puts the load upon the dolly when the pipe is being removed.

As indicated heretofore, Figures 1 and 2 show a pressure fluid, or, it might be said, pneumatically or hydraulically operated main cylinder 38 for moving the dolly.

Figure 6:
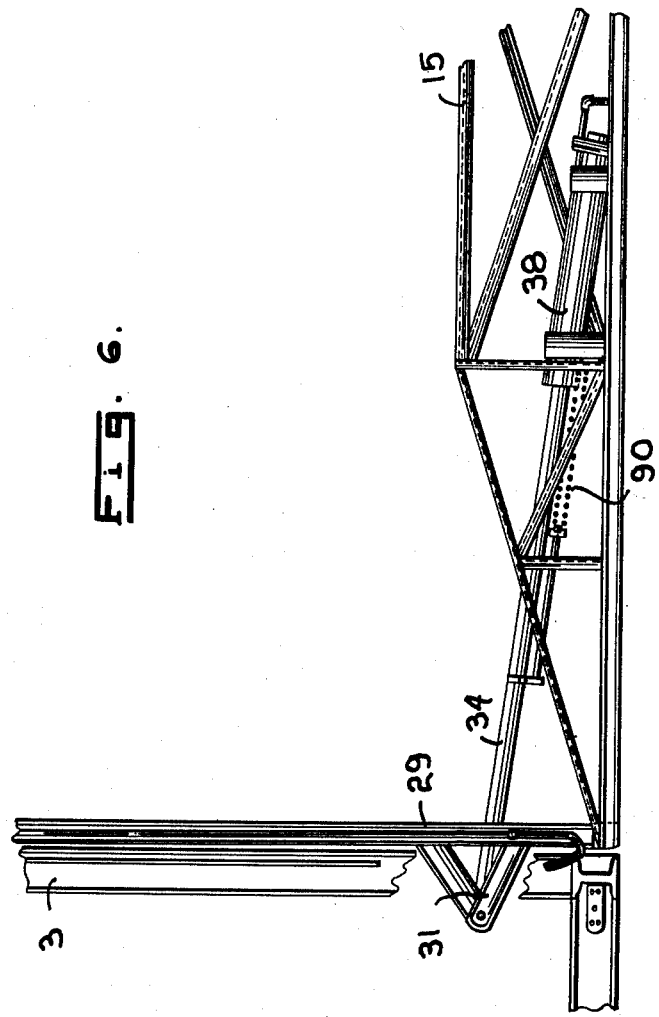
Fig. 6 is a view similar to Fig. 5 but illustrating the mechanism as having been operated to elevate the dolly to the derrick floor.

Figures 5 and 6, however, show a modified form of mechanism wherein the main cylinder 38 is located under the pipe rack and has the piston rod 34 connected thereto so that it is pivoted to the braces or levers 31 and 29 in the same manner as described in connection with Fig. 1. In Figures 5 and 6, however, the pressure fluid from the conduit 40 is introduced at the outer end 89 of the cylinder so as to force the piston inwardly. A spring 90 is connected to the piston rod and normally holds the rod in retracted position, as seen in Fig. 5, so that the dolly is in its lowermost position. When, however, the pressure fluid is introduced into the cylinder, the dolly will be elevated by the lever mechanism, as seen in Fig. 6, and the spring 90 stretched due to the application of this force. When, however, the pressure fluid is released, the spring, reacting against the lever mechanism, provides the force necessary to retract the dolly to the point at which gravitational force comes into effect and returns it to normal position.

Where circumstances demand it, the power operating cylinder can be made double acting thereby making it possible to utilize pneumatic or hydraulic fluid for lowering as well as raising the dolly into position.

Figure 8:
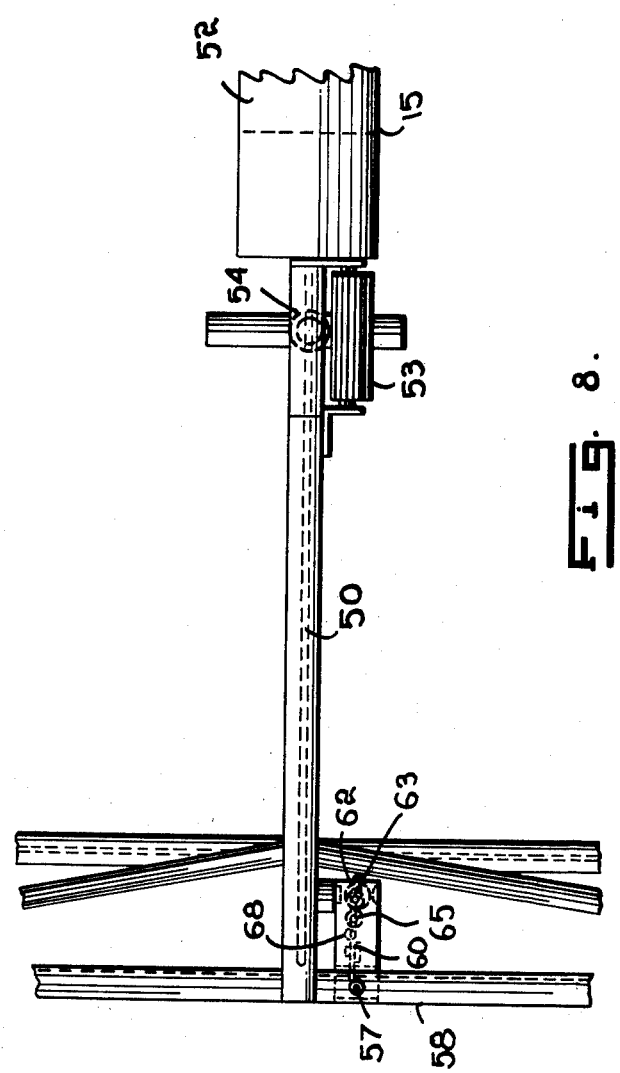
Fig. 8 is a top plan view illustrating details of the roller mechanism whereby the pipe sections may be moved longitudinally as they are rolled from the pipe rack onto the slide so as to have them longitudinally positioned for admission to the pipe dolly.
Figure 9:
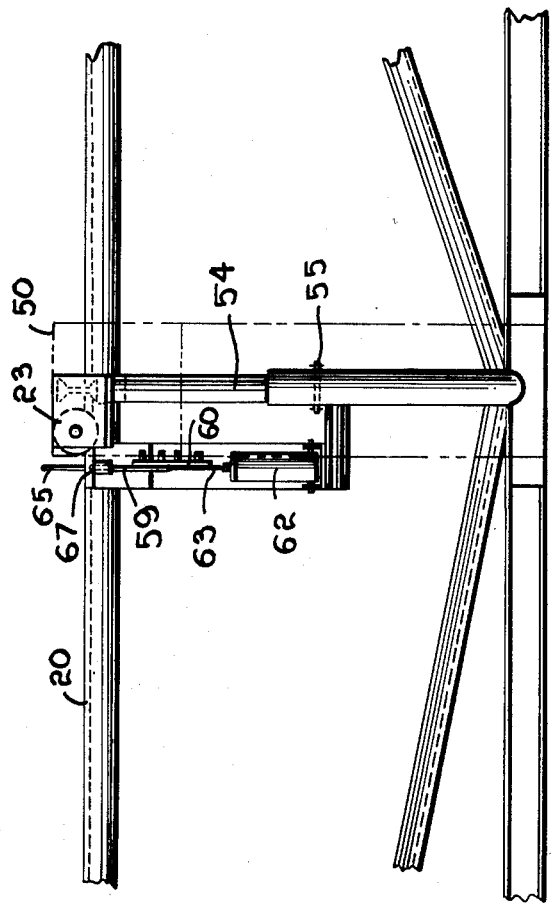
Fig. 9 is a broken detailed view looking downwardly along the slide and illustrating the arrangement of the admission devices which stop each pipe section to be admitted in turn to the dolly.

Fig. 8 illustrates a plurality of openings 68, so that the stop pin 65 may be adjusted to accommodate different sizes or diameters of pipe.

It is to be understood that in any mechanism where fluid or hydraulic pressures have been used, that either mechanical or electrical sources of power may be employed, as the circumstances justify.

In some instances the casing for the well has threaded and coupled connections where in other instances the ends of the casing are plain and are to be welded. In either instance the pipe handler herein may be quickly adapted for use in handling such casing. The same is true in introducing and removing tubing. The pipe handler may be readily employed.

Broadly the invention contemplates an automatic pipe handler which may be operated either pneumatically, hydraulically, mechanically, or by any suitable power mechanism so as to elevate and lower the pipe sections relative to the derrick floor.

What is claimed is:

1. A unitary pipe handler device for rotary drilling rigs to furnish pipe sections to the derrick floor when making up or adding to a string of pipe, and for removing pipe sections from the derrick floor in breaking down a string of pipe comprising, a pipe dolly and mechanical means to elevate and lower one end thereof from pipe rack to and from derrick floor elevations comprising, a lever linkage connection to the derrick floor end of the dolly, a roller on the outer end of said dolly, and a pipe rack having a trackway to receive said pipe sections.

2. A pipe handler device according to claim 1 wherein said lever linkage connection includes a trunnion member secured to the underside of said dolly, and a bell crank lever having one arm pivotally connected to said trunnion member and the other arm thereof to a lever actuating power element.

3. A pipe handler for transferring pipe sections between a pipe rack and the derrick floor of a well drilling rig, comprising, a trackway positioned adjacent the pipe rack, a pipe dolly mounted for longitudinal movement along said trackway, mechanical means for raising and lowering one end of said dolly between the elevations of said pipe rack and said derrick floor, said means comprising a lever linkage connection to the end portion of said dolly adjacent the derrick floor and roller means on the outer end of said dolly rollably positioned on said trackway, and means to supply pipe sections to said dolly from the pipe rack including an inclined slide extending downwardly from the pipe rack to the dolly and roller means to position the pipe sections longitudinally of said slide and dolly.

4. A pipe handler for transferring pipe sections between a pipe rack and the derrick floor of a well drilling rig, comprising, a trackway positioned adjacent the pipe rack, a pipe dolly mounted for longitudinal movement along said trackway, mechanical means for raising and lowering one end of said dolly between the elevations of said pipe rack and said derrick floor, said means comprising a lever linkage connection to the end portion of said dolly adjacent the derrick floor and roller means on the outer end of said dolly rollably positioned on said trackway, means to supply pipe sections to said dolly from the pipe rack including an inclined slide extending downwardly from the pipe rack to the dolly and roller means to position the pipe sections longitudinally of said slide and dolly, and stop means mounted adjacent the lower end of said slide and projectible upwardly therefrom into the path of movement of said pipe sections toward said dolly.

5. A pipe handler for transferring pipe sections between a pipe rack and the derrick floor of a well drilling rig, comprising, a trackway positioned adjacent the pipe rack, a dolly mounted for longitudinal movement along said trackway, mechanical means for raising and lowering one end of said dolly between the elevations of said pipe rack and said derrick floor, said means comprising a lever linkage connection to the end portion of said dolly adjacent the derrick floor and roller means on the outer end of said dolly rollably positioned on said trackway, and means to unload pipe sections from said dolly to said pipe rack, said last mentioned means comprising an elevator element mounted on said dolly and projectible upwardly therefrom against a pipe section supported on said dolly.

WILLIAM R. KING.

References Cited in the file of this patent
UNITED STATES PATENTS

| Number | Name | Date |
|---|---|---|
| 845,152 | Weir | Feb. 26, 1907 |
| 1,829,879 | Stephens | Nov. 3, 1931 |
| 1,922,980 | Reis | Aug. 15, 1933 |
| 2,113,270 | Hall et al. | April 5, 1938 |
| 2,278,035 | Baker | Mar. 31, 1942 |
| 2,397,192 | Meyerbach | Mar. 26, 1946 |
| 2,535,546 | Pitts | Dec. 26, 1950 |
| 2,558,554 | Harvey | June 26, 1951 |